United States Patent [19]

Jankowski

[11] Patent Number: 5,311,900

[45] Date of Patent: * May 17, 1994

[54] LEAK RESISTANT PLUG VALVE

[75] Inventor: Steven C. Jankowski, Roscoe, Ill.

[73] Assignee: Mueller Co., Decatur, Ill.

[*] Notice: The portion of the term of this patent subsequent to Aug. 3, 2010 has been disclaimed.

[21] Appl. No.: 61,566

[22] Filed: May 17, 1993

Related U.S. Application Data

[63] Continuation of Ser. No. 883,471, May 15, 1992, Pat. No. 5,232,009.

[51] Int. Cl.$^5$ .............................................. F16K 3/22
[52] U.S. Cl. ................................ 137/246; 137/246.15; 251/309
[58] Field of Search .......................... 137/246, 246.15; 251/309, 317, 355

[56] References Cited

U.S. PATENT DOCUMENTS 2,719,023  9/1955  Clade ........................ 137/246.22 X
3,279,492 10/1966  Bell et al. ...................... 251/309 X
3,722,853  3/1973  Dargatz et al. .

OTHER PUBLICATIONS

Series 175 Lube-Ring Gas Service Valve, Rockford-Eclipse Bulletin G-615.

Primary Examiner—Gerald A. Michalsky
Attorney, Agent, or Firm—Cushman, Darby & Cushman

[57] ABSTRACT

A plug-type gas valve in which a key with a radially extending passageway is supported to rotate between open and closed positions within a bore in a valve body, the passageway establishing communication between diametrically spaced inlet and outlet ports when the key is in its open position. O-rings are positioned in grooves formed in the outer surface of the key above and below the passageway and seal against the wall of the bore in the body to prevent leakage. To lubricate the O-rings and further guard against leakage, grease is injected into pairs of axially extending grease channels formed in the outer surface of the key. To prevent the grease from being blown out of the valve by high pressure when the valve is partially open, one grease channel of each pair communicates only with the upper O-ring groove while the other grease channel of each pair communicates only with the lower O-ring groove.

2 Claims, 2 Drawing Sheets

LEAK RESISTANT PLUG VALVE

This is a continuation of application Ser. No. 07/883,471, filed May 15, 1992, U.S. Pat. No. 5,232,009.

TECHNICAL FIELD

The subject invention relates to plug valves, and especially to plug valves which are used, for example, in natural gas lines.

BACKGROUND OF THE INVENTION

Natural gas commonly is distributed through a system of pipelines which lead ultimately to residential and other consumers. Various types of valves are used to control the flow of gas to the consumer's meter, one type commonly being referred to as a plug valve.

Plug valves typically have a valve body through which there is a generally cylindrical central bore. The valve body also has an inlet port and an outlet port which extend through the body and communicate through the central bore. Usually, the outer ends of the inlet and outlet ports are threaded so that the valve may be connected to threaded pipe.

Plug valves also have a "plug" or "key" which is mounted so that it can rotate in the central bore of the valve body. The key has a passageway extending through it. When the valve is in an open position, gas can pass through the inlet port, through the passageway in the valve key, and out through the outlet port. When the key is rotated to a closed position, the passageway in the key no longer communicates with the inlet and outlet ports, and the key blocks gas from flowing through the valve.

The valve usually has at least one pair of O-ring seals. There is a upper O-ring located above the ports and passageway and a lower O-ring located below the ports and passageway. These O-rings are situated in grooves which are provided either on the surface of the central bore or on the valve key. The O-rings serve to seal the valve and prevent gas from leaking out of the valve through the small gap which exists between the central bore and the key.

The valve is greased to further reduce the likelihood of leaks. It is important, however, that the grease be distributed through the gap and around the O-rings. One way to help insure that this happens is to provide the valve key with grease channels.

Grease channels typically are cut into the outer surface of the key. The key usually has several of these channels, and they usually run the length of the key between the upper O-ring groove and the lower O-ring groove. Grease may be introduced into the interior of the valve, e.g., through a grease port provided in the valve body. The grease channels then will tend to carry the grease across the surface of the key and central bore and upwardly and downwardly toward the O-rings.

Plug valves of this type have been used widely and with generally good results for many years. They frequently are used as the main shut-off valve for a residence or other structure. After installation of the gas lines to and in the structure, it is common to "blow down" the lines. That is, the main valve is opened, as are all downstream valves, and gas is allowed to blow through the line. This procedure may be performed several times so that all air is removed from the lines, the lines may be checked completely for leaks, and all leaks may be sealed.

During blow down, gas flows through the line at relatively high speed. Workers frequently will not open the valve completely during blow down. When the valve is only partially opened, the grease channels on the key may be rotated into a position where they are over, that is, they communicate with the inlet and outlet ports. When this happens, gas pressure can cause the valve to "cavitate", or to loose grease.

More specifically, grease can be forced upwardly and downwardly in the grease channel over the inlet port and into the O-ring grooves. It then can blow around the circumference of the O-ring grooves until it reaches the grease channel situated over the outlet port. At this point, grease can flow upwardly and downwardly into the grease channel and can be blown out the outlet port. This loss of grease may cause the valve to leak.

An object of this invention, therefore, is to provide a plug type valve which is less susceptible to leaks and which is less likely to cavitate during blow down procedures.

Another object of this invention is to provide such improved plug valves which are as easily and economically manufactured as conventional plug valves.

Those and other objects and advantages of the invention will be apparent to those skilled in the art upon reading the following detailed description and upon reference to the drawings.

SUMMARY OF THE INVENTION

The objects of the invention are achieved, in general, by short circuiting the flow through the grease channels and O-ring grooves, that is, by insuring that any grease channel exposed to the inlet port and any grease channel simultaneously exposed to the outlet port do not communicate with the same O-ring groove. In accordance therewith, the subject invention provides for a plug valve for controlling the flow of gas through a line, which valve comprises a body portion and a valve key, wherein (a) the body portion comprises a generally cylindrical bore and inlet ports which communicate with the bore; (b) the valve key is mounted to rotate in the bore between open and closed positions connecting and disconnecting the inlet and outlet ports; (c) the valve key comprises an upper O-ring groove, a lower O-ring groove, and one or more pairs of grease channels, wherein the paired grease channels are disposed on substantially opposite surfaces of the valve key; and (d) wherein at least one grease channel of each pair of grease channels is disconnected from each of the O-ring grooves.

DETAILED DESCRIPTION OF THE INVENTION

Figure 1:
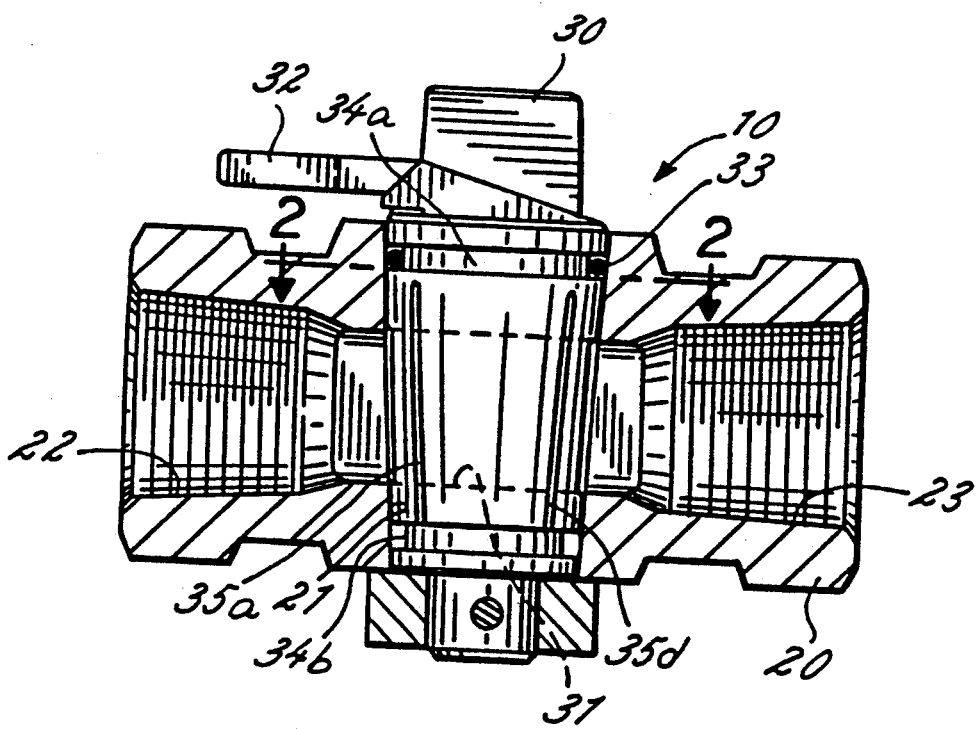
FIG. 1 is a view of a preferred embodiment of the plug valve of the subject invention, the body of the valve being shown in axial cross section and the valve key being shown primarily in front elevation.

As best shown in FIG. 1, a preferred embodiment of the subject invention comprises a plug valve 10 which generally includes two main components, namely, a valve body 20 and a valve key 30. The valve body 20 has a generally cylindrical central bore 21. The valve body 20 also has an inlet port 22 and an outlet port 23 which extend through the body 20 and communicate with the central bore 21. Preferably, the outer ends of the inlet 22 and outlet ports 23 are threaded so that the valve 10 may be connected to threaded pipe.

The key 30 is mounted so that it can rotate in the central bore 21. Preferably, and as shown in FIG. 1, the bore 21 tapers slightly inwardly from the top to the bottom of the valve body 20, and the key 30 has a corresponding taper. This enables the key 30 to be seated in the central bore 21 more precisely and reliably.

Figure 2:
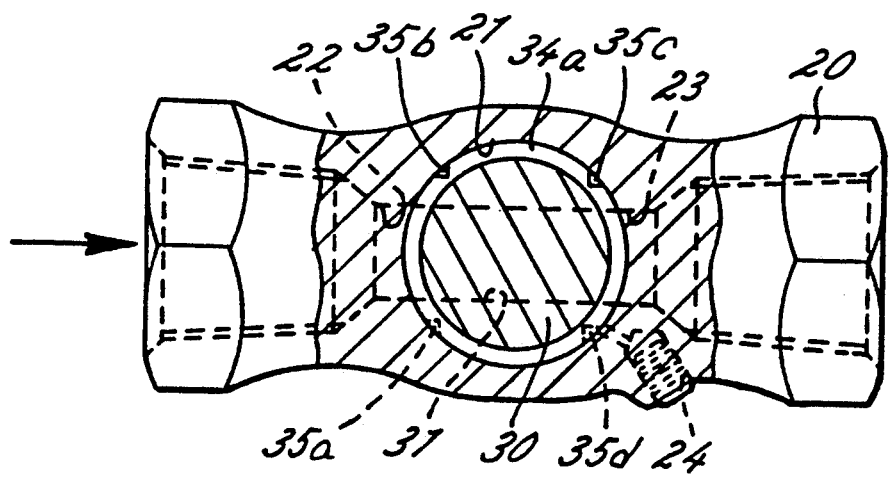
FIG. 2 is a cross sectional view, taken generally along line 2—2 of FIG. 1 and showing the valve is in a fully open position.
Figure 4:
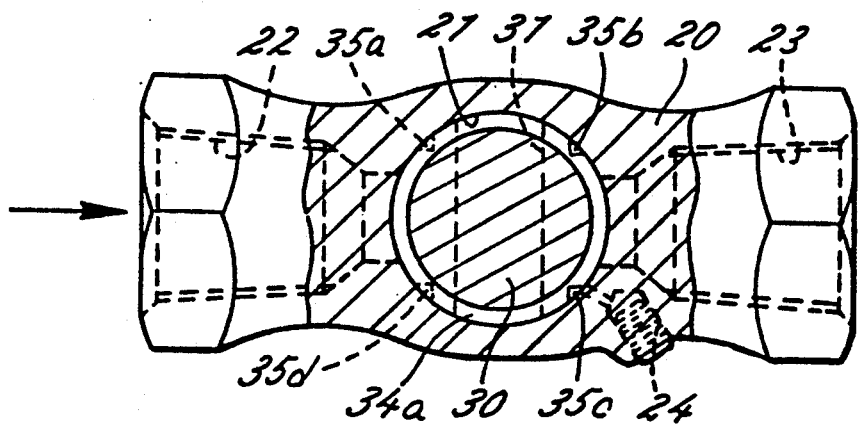
FIG. 4 is another view similar to FIG. 2, except that the valve key has been rotated approximately 90° in a clockwise direction to place the valve in a fully closed position.

The key 30 has a passageway 31 (shown in phantom) extending through it. When the valve is in an open position, as best seen in FIGS. 1 and 2, gas can enter through the inlet port 22, pass through the passageway 31, and exit through the outlet port 23. When the key 30 is rotated to a closed position, as can be seen in FIG. 4, the passageway 31 in the key 30 no longer communicates with the inlet 22 and outlet ports 23, and thus the key 30 blocks gas from flowing through the valve 10. A lock wing 32 may be provided to enable the key to be locked in its closed position.

The valve 10 comprises a pair of O-ring seals 33, only one of which is seen in FIG. 1, although additional O-rings may be provided if desired. There is an upper O-ring 33 which is located above the ports 22 and 23 and passageway 31 and a lower O-ring (not shown) which is located below the ports 22 and 23 and passageway 31. These O-rings 33 are situated in grooves 34 formed in the valve key 30, although suitable O-ring grooves also could be provided in the central bore 21.

Four grease channels 35 are cut into the surface of the key 30, and the valve body 20 is provided with a grease port 24 (shown in phantom) through which grease may be introduced. In the preferred embodiment, the grease channels 35 are V-shaped. Other configurations, such as U-shaped, square or C-shaped grease channels may be used, as will be appreciated by those familiar with the art, so long as they adequately distribute grease throughout the key and about the O-rings 33.

The four grease channels 35 may be considered as consisting of two pairs, the first pair consisting of grease channels 35a and 35c and the second pair consisting of grease channels 35b and 35d. Grease channel 35a grease channel 35c. Likewise, grease channel 35b is substantially opposite to grease channel 35d. By substantially opposite, it is meant only that at some point in the rotation of the key 30 from a fully opened position to a fully closed position, one grease channel in a pair will be exposed to the inlet port 22 while the other grease channel will be exposed to the outlet port 23, for example, as shown by the channels 35a and 35c in FIG. 3.

Unlike prior art plug valves, the grease channels 35 do not run the full length between the upper O-ring groove 34a and the lower O-ring groove 34b. More specifically, and referring also to FIG. 5, grease channel 35a communicates with the lower O-ring groove 34b, but not with the upper O-ring groove 34a. The other channel in this pair, grease channel 35c, communicates with the upper O-ring groove 34a, but not with the lower O-ring groove 34b. Likewise, grease channel 35b communicates only with the upper O-ring groove 34a while grease channel 35d communicates only with the lower O-ring groove 34b. In this manner, the flow of grease that otherwise might occur through the paired opposing grease channels 35 and the O-ring grooves 34 is blocked.

Figure 3:
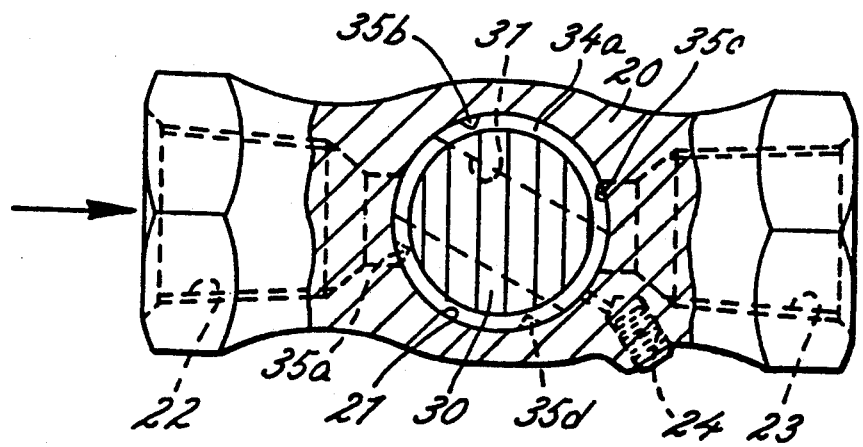
FIG. 3 is a view similar to FIG. 2, except that the valve key has been rotated approximately 30° in a clockwise direction to place the valve in a partially open position.
Figure 5:
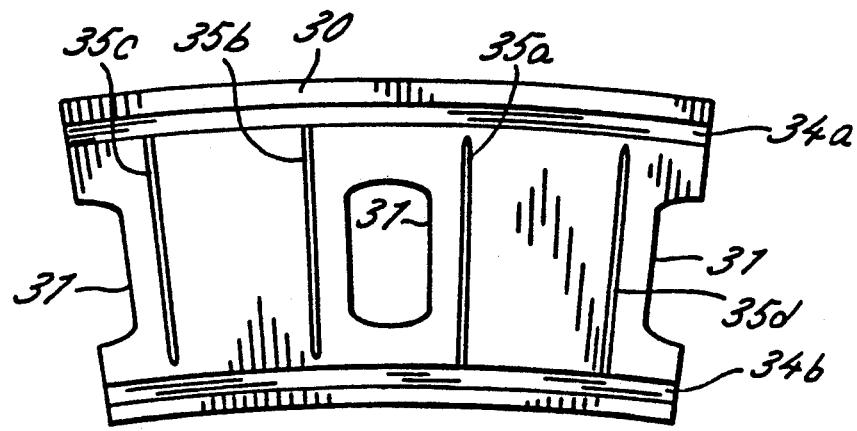
FIG. 5 is a rolled out view of the surface of the valve key of the valve shown in FIG. 1.

For example, in the fully open or fully closed positions, as best seen in FIGS. 2 and 4, none of the grease channels 35 is exposed to the inlet or outlet ports 22, 23. Thus, cavitation is unlikely to occur. When the valve is partially open, as shown in FIG. 3, grease channels, in this instance, grease channels 35a and 35c are exposed to the inlet and outlet ports 22 and 23, respectively. Referring also to FIG. 5, it can be seen that if grease is forced down grease channel 35a into the lower O-ring groove 34b, it may not thereafter enter grease channel 35c as it would in prior art designs. Although grease channel 35c communicates with the upper O-ring groove 34a, grease cannot flow into the upper O-ring groove 34a from grease channel 35a because they are not in communication with each other. Thus, the flow of grease through the paired, opposing grease channels and the O-rings is disconnected and cavitation cannot occur. At the same time, however, grease is able to flow from the grease channels about the O-rings for purposes of lubrication.

The illustrative embodiment has four, i.e., two pairs of grease channels, but more or less could be provided as deemed necessary to provide adequate distribution of grease throughout the valve. If there are grease channels closely spaced, such that more than two grease channels are exposed to the ports in a given position, it should be appreciated that a grease channel may be "paired" with more than one other channel. So long as the paired grease channels do not communicate with the same O-ring groove, however, grease flow around the O-ring groove will be blocked.

Further, it should be appreciated that the key 30 could be provided with grease channels which extend fully between the O-ring grooves if such grease channels are not exposed to the inlet or outlet ports at the same time as other grease channels. For example, if the valve shown in the FIGS. 1–5 was restricted to rotate clockwise only 90° from the closed position to the open position, and could not be opened by counterclockwise rotation, the grease channel 35b and 35d could communicate with both O-ring grooves 34 because neither grease channel would at any time be exposed to gas flow.

While this invention has been disclosed and discussed primarily in terms of specific embodiments thereof, it is not intended to be limited thereto. For example, it is expected that this valve will have useful application in controlling the flow of other gaseous compositions in addition to natural gas. Other modifications and embodiments will be apparent to those familiar with the art.

I claim:

1. A plug valve controlling the flow of gas through a line, which valve comprises a body portion and a valve key, wherein
   (a) said body portion comprises a bore and further comprises an inlet port and an outlet port which communicate with said bore;

(b) said valve key is mounted to rotate in said bore between open and closed positions connecting and disconnecting said inlet and outlet ports;

(c) said valve key comprises a first and second O-ring groove, an O-ring disposed in each said O-ring groove with said O-ring grooves being located at opposite ends of said valve key and at least one pair of grease channels, wherein said grease channels are disposed on the surface of said valve key; and (d) each said grease channel is disconnected from at least one of said O-ring grooves but connected to the other said O-ring groove with each grease channel connected to a different O-ring groove.

2. The valve of claim 1, wherein said grease channels are V-shaped.

* * * * *

UNITED STATES PATENT AND TRADEMARK OFFICE
CERTIFICATE OF CORRECTION

PATENT NO. : 5,311,900
DATED : May 17, 1994
INVENTOR(S) : Donald Brown, Richard Donaj It is certified that error appears in the above-indentified patent and that said Letters Patent is hereby corrected as shown below:

Claim 1, column 3, line 50 after "face" insert --a handgrip and an outer surface adapted to face--.

Signed and Sealed this

Twenty-third Day of August, 1994

Attest:

BRUCE LEHMAN

*Attesting Officer*     *Commissioner of Patents and Trademarks*